United States Patent [19]
Graf

[11] Patent Number: 5,114,483
[45] Date of Patent: * May 19, 1992

[54] OPEN-GRADED ASPHALT

[75] Inventor: Peter E. Graf, Orinda, Calif.

[73] Assignee: Chevron Research and Technology Company, San Francisco, Calif.

[*] Notice: The portion of the term of this patent subsequent to Aug. 9, 2005 has been disclaimed.

[21] Appl. No.: 219,112

[22] Filed: Jul. 14, 1988

Related U.S. Application Data

[63] Continuation-in-part of Ser. No. 925,334, Oct. 31, 1986.

[51] Int. Cl.$^5$ ............................................. C08L 95/00
[52] U.S. Cl. ................... 106/281.1; 106/277; 252/311.5
[58] Field of Search ............... 106/281.1, 281 R, 277; 252/311.5

[56] References Cited
U.S. PATENT DOCUMENTS 4,373,961 2/1983 Stone ........................ 106/281 R
4,523,957 6/1985 Graf ............................. 106/277
4,762,565 8/1988 Graf ............................ 106/281.1

Primary Examiner—Amelia Burgess Yarbrough
Attorney, Agent, or Firm—R. C. Gaffney; J. J. DeYoung

[57] ABSTRACT

A paving composition comprising about 80 to 97% by weight of an open-graded aggregate and about 3 to 20% asphalt, said composition being formed by successively mixing two asphalt-containing emulsions A and B with said aggretate wherein:

emulsion A comprises about 40 to 75% by weight of a soft asphalt having a viscosity in the range of 50 to 1000 centistokes at 210° F. and 0.05 to 5% by weight of a emulsifier, and water as a continuous phase of said emulsion to make up 100% by weight; and emulsion B comprises about 40 to 75% by weight of a hard asphalt having a penetration 5 to 25 dmm at 77° F. and 0.05 to 5% by weight of a emulsifier, and water as a continuous phase of said emulsion to make up 100% by weight.

11 Claims, No Drawings

OPEN-GRADED ASPHALT

CROSS-REFERENCE TO RELATED APPLICATION

This application is a continuation-in-part of Ser. No. 925,334, filed Oct. 31, 1986, the entire disclosure of which is incorporated herein by reference.

BACKGROUND OF THE INVENTION

Field of the Invention

This application relates to open-graded, emulsified asphalt compositions suitable for pavements; their preparation, and methods for their preparation.

Open-graded pavements are generally defined in the paving art as aggregate blends or asphalt mixtures which have high voids content. The pavements may be prepared with either hot-mix asphalt or with asphaltic emulsions. They possess the characteristics of relatively low cost, and the ability to allow water drainage through the pavement structure. This last feature makes the pavements particularly desirable for overlays on existing high-speed highways to prevent "hydroplaning" vehicle skids caused by a film of water created between a smooth pavement surface and the tire surface.

The open-graded, emulsified asphalt pavements are of particular interest in remote areas far from plants where hot-mix asphalts are available. With the use of the emulsified asphalts, blending of the emulsions with the cold aggregates may be performed in blending plants set up easily in the remote areas.

With the use of emulsified asphalts in constructing open-graded pavements, several problems have, however, arisen. Because of the porous nature of the mix, the use of conventional slow setting emulsions (SS type) is not feasible. In such case, substantial amounts of the emulsion will drain from the structure (runoff) before setting occurs, resulting in loss of asphalt. The onset of rain before complete set occurs will result in the loss of even more asphalt from the pavement (washoff). Both runoff and washoff result in loss of strength in the pavement and possible environmental contamination. Therefore, to reduce these problems, the emulsions used in these applications have been weakly stabilized medium setting (MS type) so designed that they "break" when mixed with the aggregate. However, because of this early break, incomplete coating of the aggregate and poor adhesion of the asphalt and aggregate often occurs. In most cases, these results have been ameliorated by the addition of substantial quantities (5-15%, usually 8-10%, by weight relative to the weight of emulsion) of petroleum naphtha-solvents to the mixes. This results in softening of the asphalt providing better coverage and adhesion.

With the use of naphtha, new problems have arisen. First, the cost is high for the naphtha which is simply lost to the atmosphere by evaporation. Second, evaporation of the naphtha raises possible air pollution problems. Third, the hazard of fire during the operation is enhanced. Fourth, because naphtha softens the asphalt, the pavement requires considerable time to achieve full strength, and the use of heavy vehicles on the pavement before full strength is achieved may result in rutting of the surface. Therefore, it is desirable to produce open-graded emulsified asphalt paving mixes which display good aggregate coating properties and achieve desirable runoff and washoff characteristics without the use of naphtha, and form pavements which develop their full strength rapidly.

U.S. Pat. No. 4,523,957 discloses low naphtha content open graded asphalt emulsions containing ionic polyelectrolytes.

SUMMARY OF THE INVENTION

Disclosed is a paving composition comprising about 80 to 97% by weight of an open-graded aggregate and about 3 to 20% asphalt, said composition being formed by successively mixing two asphalt-containing emulsions, A and B, with said aggregate and wherein:

emulsion A comprises about 40 to 75% by weight of a soft asphalt having a viscosity in the range of 50 to 1000 centistokes at 210° F. and 0.05 to 5% by weight of a emulsifier, and water as a continuous phase of said emulsion to make up 100% by weight; and emulsion B comprises about 40 to 75% by weight of a hard asphalt having a penetration 5 to 25 dmm at 77° F. and 0.05 to 5% by weight of a emulsifier, and water as a continuous phase of said emulsion to make up 100% by weight.

DETAILED DESCRIPTION OF THE INVENTION

The new composition of this invention involves an open-graded paving composition which is made from aggregate and two asphalt-containing emulsions. One emulsion contains a relatively soft asphalt and the other emulsion contains a relatively hard asphalt. Both emulsions are low in naphtha content and may be essentially free of petroleum naphtha. Both emulsions break rapidly when mixed with aggregate. It has been surprisingly found that a workable paving composition is formed by the separate application of two asphalt emulsions as compared to the use of a single emulsion containing the same hard and soft asphalts.

EMULSION A

Emulsion A comprises about 40 to 75% by weight of a soft asphalt having a viscosity in the range of 50 to 1000 centistokes at 210° F. and 0.05 to 5% by weight of a emulsifier, and water as a continuous phase of said emulsion to make up 100% by weight. Preferably, the soft asphalt has a viscosity in the range 300 to 600 centistokes at 210° F.

EMULSION B

Emulsion B comprises about 40 to 75% by weight of a hard asphalt having a penetration of 5 to 25 dmm at 77° F. and 0.05 to 5% by weight of a emulsifier, and water as a continuous phase of said emulsion to make up 100% by weight. Preferably, the hard asphalt has a penetration of 10 to 20 dmm at 77° F.

LOW-BOILING HYDROCARBONS

Either emulsion can contain from 0 to 15 weight percent lower-boiling hydrocarbons. However, both emulsions are preferably very low in lower-boiling hydrocarbon content and contain from about 0 to 5 weight percent lower boiling hydrocarbons. Still more preferably both emulsion contain 3 weight percent or less lower boiling hydrocarbons. By lower-boiling hydrocarbons it is meant naphtha and other lower-boiling hydrocarbons which have commonly been used in asphalt emulsions. Both emulsions may be essentially free of naphtha and other lower boiling hydrocarbons. By "essentially free" it is meant less than 1% by weight relative to the weight of the emulsion.

THE EMULSIFIERS

Both emulsions A and B are made with conventional and well known methods using conventional asphalt emulsifiers. The emulsions are prepared by mixing molten asphalt and an aqueous solution of emulsifier under high shear at elevated temperature. Preferred are the cationic emulsifiers.

One type of suitable asphalt emulsion is prepared with cationic emulsifiers. Among those are the emulsions described in U.S. Pat. Nos. 3,026,266, 3,096,292, 3,220,953, and 3,445,258. Any suitable cationic emulsifier capable of emulsifying bitumen in water may be used including cation active salts of quaternary nitrogen bases, salts of fatty amines, preferably straight-chain primary fatty mono and diamines, amidoamine salts, such as amidoamine hydrochloride of stearic acid, etc., the hydrohalide salts of aminoamides of polyalkylene polyamines such as tetraethylene pentamines and fatty acids, etc. Another class of suitable emulsifiers is that including the salts of ethylene oxide adducts of fatty diamines and of the ethylene oxide adducts of hydrocarbon-substituted imidazolines. This list is, of course, only illustrative, and not inclusive. The use of mixture of the various cationic emulsifiers is also contemplated. The preferred cationic emulsifiers are those described as the salts of quaternary nitrogen bases disclosed in U.S. Pat. No. 3,220,953. These compounds are those materials of the preferred formula

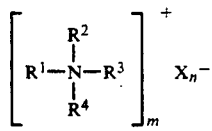

in which $R^1$, $R^2$, $R^3$ and $R^4$ are organic radicals, each having a carbon-nitrogen linkage to the nitrogen atom, X is an anion whose valence does not exceed 2, and m and n are small integers which indicate the molar proportions of the cation and anion required to form the respective salt. Preferred emulsifying salts are those in which the organic radicals $R^1$, $R^2$, $R^3$ and $R^4$ are alkyl, alkenyl, hydroxyalkyl, arylalkyl or alkylaryl radicals of 1 to 24 carbons atoms or heterocyclic groups of 4 to 10 carbon atoms in which from 2 to 3 of the nitrogen valences are shared by two carbon atoms in a single heterocyclic group. In all of these salts of quaternary nitrogen bases suitable for use as cationic emulsifiers in the preparation of oil-in-water type emulsions the combined or total number of carbon atoms in the cationic portion of their molecule should be large enough to impart oil solubility and emulsifying properties, and preferably should be equal to and not less than 15 and not more than 30 carbon atoms. In other words, this class of cationic quaternary nitrogen-containing compounds is formed by salts of tetra-substituted ammonium bases and by salts of heterotetra cyclic nitrogen bases, such as pyridinium, quinolinium, isoqunilinium, morpholinium, piperidinium, imidazolinium, and other like quaternary nitrogen-containing bases. The anion may be either a halide (X—), a methosulfate ($CH_3O$—$SO_3$—), a nitrate ($NO_3$—) or the like ion. Monovalent anions are preferred, particularly the halide anions.

Numerous cationic quaternary nitrogen-containing emulsifiers may be employed for the preparation of cationic oil-in-water type emulsions. Among them, to mention but a few, are:

N,N-dimethyl-N-benzyl-N-octadecyl ammonium chloride,
N,N-dimethyl-N-hydroxyethyl-N-dodecyl ammonium chloride
N,N-dimethyl-N-benzyl-N-octadecenyl ammonium chloride
N,N-dimethyl-N-benzyl-N-dodecyl ammonium chloride,
N,N-dimethyl-N-hydroxyethyl-N-benzyl ammonium chloride,
Hexadecyl pyridinium chloride,
Hexadecyl triethyl ammonium bromide,
Octadecylbenzyl trimethyl ammonium methosulfate,
Isopropylnaphthyl trimethyl ammonium chloride,
Octadecyl pyridinium bromide, 1-(2-hydroxyethyl)-2-heptadecenyl-1-(4-chlorobutyl)imidazolinium chloride,
Hexadecyl methyl piperidinium methosulfate,
Dodecyl hydroxyethyl morpholinium bromide.

Among the quaternary nitrogen-containing materials available in commerce as cationic emulsifiers for the preparation of oil-in-water type emulsions, there are quaternary ammonium salts, such as quaternary ammonium halide materials sold by General Mills under the trademark "ALIQUAT"; materials sold by Akzo Chemie under the several "ARQUAD" trademarks; certain quaternized materials developed and sold by the Society of Chemical Industry, in Basel, Switzerland, under the several "SAPAMINE" trademarks, and many others.

The active cationic component of these meterials contains the characteristic positively charged quaternary nitrogen configuration

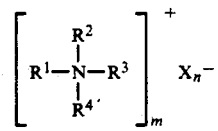

in which the total of carbon atoms of $R^1$, $R^2$, $R^3$ and $R^4$ is sufficient to impart oil solubility and emulsifying properties, and preferably is equal to not less than 15 and not more than 30 carbon atoms.

Best emulsification can be achieved with those among the aforesaid quaternary nitrogen-containing materials in which the active cationic component contains at least one long aliphatic hydrocarbon chain of not less than 12 and not more than 24 carbon atoms, such as an alkyl or an alkenyl chain. This latter chain may be derived from a mixture of organic materials such as tallow, soybean oil, lard, etc.

The emulsifier material may consist entirely of an active cationic salt of a quaternary nitrogen base, or may also contain some impurities, such as acyl chlorides and amines. It may also be employed in the form of a concentrated aqueous solution and may contain auxiliary stabilizers in amounts conventionally employed in the trade.

Among the available commercial emulsifier materials of this type, the following may be employed for the preparation of cationic emulsions in accordance with the invention:

HYAMINE 2389. This is the trademark of a product of Rohm and Haas Chemical Company, of Philadelphia, Pennsylvania, for alkyl methyl benzyl-N,N,N-trimethyl ammonium chloride, which has the following formula

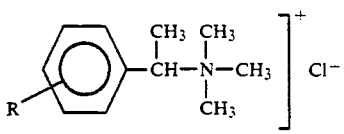

wherein R averages about 12 carbon atoms.

(2) ARQUAD T. This is the trademark of a product of Akzo Chemie of Chicago, Ill., for $C_{14}$-$C_{18}$ alkyl trimethyl ammonium chloride, which has the following formula:

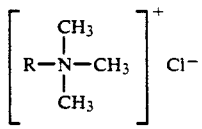

wherein R is a long alkyl chain derived from tallow.

(3) HYAMINE 1622. This is the trademark of a product of Rohm and Haas Chemical Company of Philadelphia, Pa., for di-isobutyl phenoxyethoxy ethyl dimethyl benzyl ammonium chloride monohydrate.

(4) ARQUAD S. This is the trademark of a product of Armak Company of Chicago, Ill., for $C_{16}$-$C_{18}$ alkyl trimethyl ammonium chloride, which has the formula:

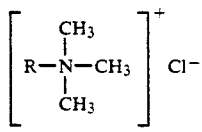

wherein R is a long alkyl chain derived from soybean oil.

It is believed that minor amounts of the starting materials, e.g., the amines, are ordinarily present in the aforementioned emulsifiers as impurities. These are of no consequence to their operativeness according to the invention.

These and other suitable cationic emulsifiers may be employed in varying amounts, generally from about 0.05 to about 5%, and preferably from about 0.40 to about 2% of the active cationic component, based on the weight of the finished emulsion, although more or less may be employed depending upon factors such as the cost of the emulsifier, its effectiveness as an emulsifying agent, the amount of bitumen dispersed, etc. The asphalt will be present in the emulsion in the amount of from about 40 to 75, preferably 60 to 70, weight percent relative to the emulsion. The balance of the emulsion will be water to make 100%.

Another type of suitable asphalt emulsion is prepared with anionic emulsifiers. Among those are the emulsions described in Canadian Patent No. 812,658, British Patent Nos. 864,102; 1,149,257; and 1,165,517, and U.S. Pat. Nos. 2,730,506; 2,436,046; 2,855,319; and 2,512,580. Any suitable anionic emulsifier capable of emulsifying bitumen in water may be used including the alkali metal salts of sulfonic acids and carboxylic acids.

Carboxylic acid emulsifiers include the salts of fatty acids, naphthenic acids and cresylic acids. These salts are usually made from the alkali metals, and sodium is the preferred metal. The carboxylic acid salts are preferred.

Other carboxylic acid emulsifiers include the salts of tall oil acids, rosin acids, fatty acid pitch (residue from fatty acid distillation) and pine chip resin extract. This latter is the preferred carboxylic acid emulsifier.

The sulfonic acids used for forming anionic emulsions include the alkylaryl sulfonates having molecular weights in the range of 400 to 500, e.g., Bis(dodecylphenyl)ether disulfonic acid, octadecylbenzene sulfonic acid, polypropylenebenzene sulfonic acid, dioctylbenzene sulfonic acid, etc. All of the above acids are utilized as their alkali metal salts, preferably the sodium salt.

Naphthenic acids extracted from petroleum sources are good emulsifying agents for this purpose. The acid number of such naphthenic acids should be in the range of 75 to 175.

The asphalt emulsions are prepared in the manner conventional for anionic or cationic bituminous emulsions. Thus, for example, in preparing the cationic emulsions the cationic emulsifier is first saponified in water, preferably at a temperature of 100°-140° F. Then the asphalt, heated at 240°-425° F. is dispersed in the resulting aqueous solution in a colloid mill. Usually, from 50 to 70 parts of asphalt are thus emulsified with 30 to 40 parts of the water solution containing the cationic emulsifier and optionally other additives. The emulsion may be used immediately thereafter or, alternatively, stored for use at a later time. The anionic emulsions are prepared in the same way using an anionic emulsifier.

THE AGGREGATE

Suitable aggregates for use with the emulsions of this invention include a wide variety of siliceous and calcareous materials. As previously mentioned, the so-called "open-graded" aggregates are preferred.

The open-graded asphalt mixes are described in "Design and Construction of Emulsified Asphalt Open Grade Mixes and Overlays" by L. D. Coyne presented at the Twenty-Third Annual Road Builders Clinic, University of Idaho, Moscow, Id., Mar. 17, 1972. Such a mix is generally defined as an aggregate-blend or asphalt mixture which has a high voids content, usually lacking in fine aggregates (sand) and mineral filters. Federal Highway Administration, Region 10, Emory Richardson, and W. A. Liddle, "Experience in the Pacific northwest with Open Graded Emulsified Asphalt Pavements" define the open-graded asphalt-paving mixes characterized by the use of asphalt emulsion, aggregates as crushed stone or crushed gravel aggregate with less than 10 percent passing the No. 10 sieve and 20 to 30 percent air voids in the compacted pavement. A consistent aspect of almost all definitions of open-graded aggregate is that less than 2 percent passes a No. 200 screen.

COMBINATION OF THE EMULSIONS AND AGGREGATE

The emulsions are combined successively with the aggregate just before use. Either emulsion may be mixed with the aggregate first. However, the best performance has been found where the soft asphalt emulsion is mixed with the aggregate first followed by addition of the hard asphalt emulsion and further mixing.

The weight ratio of the hard asphalt emulsion to soft asphalt emulsion may be in the range 1:3 to 3:1 with a 1:1 ratio being preferred.

EXAMPLES

The following examples illustrate this invention. The examples are only illustrative and are non-limiting.

EXAMPLE 1

Preparation of the Soft Asphalt Emulsion

Ten (10) parts water was mixed with 0.35 parts Tyfo K surfactant and heated to 140° F. Tyfo K was purchased from National Research Co. and is believed to be an imidazoline trimethyl ammonium chloride. 0.28 parts of hydrochloric acid was added followed by 0.35 parts of Redicote E5 surfactant. Redicote E5 is sold by Akzo Chemie and is believed to be a $C_8$–$C_{18}$ alkyl trimethyl ammonium chloride. The mixture was agitated and 22.95 additional parts of water was added. The pH was adjusted to about 2.5 to 3.5 with hydrochloric acid as needed. This water mixture was heated to 100° F.

Sixty (60) parts of a soft asphalt having a viscosity of about 50 to 200 poise at 140° F. were combined with the water mixture above in a colloid mill. To the resulting soft asphalt emulsion was added 3 parts hydrocarbon naphtha.

EXAMPLE 2

Preparation of the Hard Asphalt Emulsion

Fourteen (14) parts water was mixed with 0.20 parts Natrosol 250 H4BR, a hydroxyethyl cellulose thickener, and agitated for ½ hour.

Separately, 14 parts water were mixed with 0.1 part Tyfo K surfactant and heated to 140° F. 0.40 parts of hydrochloric acid was added followed by 0.50 parts of Redicote E5 surfactant. This mixture was agitated and combined with the thickened water solution. Then, 13.7 additional parts of water was added to this mixture. The pH was adjusted to about 1.5 to 2.5 with hydrochloric acid as needed. The resulting water mixture was heated to 140° F.

Fifty-six (56) parts of a hard asphalt having a penetration of 15 decimillimeters were heated to 400°–425° F. and combined with 0.5 parts of Tyfo K surfactant. The mixture was agitated for 10 minutes and then 0.5 part cetyl alcohol was added. The mixture was further agitated for 30 minutes until all the alcohol was blended.

Immediately thereafter, the asphalt blend and emulsifying water were combined in a colloid mill. The resulting hard asphalt emulsion was cooled to below 212° F.

EXAMPLE 3

Coating the Aggregate

In a pug mill, a coarse aggregate blend consisting of 50% 1¼ inch aggregate and 50% ⅜ inch×10 mesh aggregate and containing 2% natural moisture (95.6 parts) was first sprayed with water to increase the water content by 0.5 to 1.0% and then the aggregate was coated first with 2.6 parts of the soft asphalt emulsion described in Example 1. Then 1.8 parts of the hot, hard asphalt emulsion of Example 2 was sprayed on the aggregate near the end of the pug mill train. The resulting mixture was transported to a test strip and laid in place.

After breaking of the two emulsions the final paving composition will contain about 3 to 20, preferably 5 to 10, percent by weight of asphalt and about 97 to 80, preferably about 95 to 90 percent by weight of open-graded aggregate based on the weight of said paving composition.

EXAMPLE 4

Placement of the Asphalt

The mixture of Example 3 was successfully placed using a PF-65 Blau-Knox Paver. The resulting asphalt extracted from the open-graded paving mix had a penetration of 90–121 dmm at 77° F.

EXAMPLE 5

Combination of the Hard and Soft Asphalt Emulsions

Hard and soft asphalt emulsions substantially identically to those described above were first mixed together and then blended with an aggregate. The emulsion rapidly broke before complete coating and mixing of the aggregate rendering the mixture of aggregate and emulsion unsuitable for paving.

As will be evident to those skilled in the art, various modifications in this invention can be made or followed, in the light of the foregoing disclosure and discussion, without departing from the spirit or scope of the disclosure or from the scope of the following claims.

What is claimed is:

1. A paving composition comprising about 80 to 97% by weight of an open-graded aggregate and about 3 to 20% asphalt, said composition being formed by successively mixing two asphalt-containing emulsions A and B with said aggregate wherein:

emulsion A comprises about 40 to 75% by weight of a soft asphalt having a viscosity in the range of 50 to 1000 centistokes at 210° F. and 0.05 to 5% by weight of an emulsifier, and water as a continuous phase of said emulsion A to make up 100% by weight; and emulsion B comprises about 40 to 75% by weight of a hard asphalt having a penetration of 5 to 25 dmm at 77° F. and 0.05 to 5% by weight of an emulsifier, and water as a continuous phase of said emulsion B to make up 100% by weight and wherein said emulsifier in emulsion A and emulsion B is a cationic or anionic emulsifier.

2. The composition of claim 1 comprising 90 to 95% by weight aggregate and 5 to 10% asphalt.

3. The composition of claim 2 wherein said emulsion A soft asphalt has a viscosity in the range 300 to 600 centistokes at 210° F.

4. The composition of claim 3 wherein said emulsion B hard asphalt has a penetration in the range 10 to 20 dmm at 77° F.

5. The composition of claim 1 wherein said emulsions A and B contain naphtha.

6. The composition of claim 5 wherein said emulsions A and B also contain 3% by weight or less of naphtha.

7. The composition of claim 6 wherein the emulsifiers used in emulsions A and B are cationic emulsifiers.

8. The composition of claim 7 wherein the weight ratio of emulsion A to emulsion B is in the range 1:3 to 3:1.

9. The composition of claim 8 wherein the weight ratio of emulsion A to emulsion B is about 1:1.

10. A process for producing an open-graded paving composition comprising successively mixing two asphalt-containing emulsions A and B with open-graded aggregate wherein:

emulsion A comprises about 40 to 75% by weight of a soft asphalt having a viscosity in the range of 50 to 1000 centistokes at 210° F. and 0.05 to 5% by weight of a emulsifier, and water as a continuous phase of said emulsion A to make up 100% by weight; and emulsion B comprises about 40 to 75% by weight of a hard asphalt having a penetration of 5 to 25 dmm at 77° F. and 0.05 to 5% by weight of an emulsifier, and water as a continuous phase of said emulsion B to make up 100% by weight and wherein said emulsifier in emulsion A and emulsion B is a cationic or anionic emulsifier.

11. The process of claim 10 wherein said soft asphalt-containing emulsion is mixed with said aggregate first.

* * * * *